United States Patent Office 2,878,197
Patented Mar. 17, 1959

2,878,197

THIXOTROPIC PHENOL-ALDEHYDE ADHESIVE COMPOSITION AND METHOD OF MAKING SAME

Gene F. Baxter, Peter K. Schoening, and Henry M. Preusser, Seattle, Wash., assignors to American-Marietta Company, Seattle, Wash., a corporation of Illinois No Drawing. Application February 18, 1954
Serial No. 411,262

20 Claims. (Cl. 260—17.5)

The present invention relates to the production of a phenol-aldehyde adhesive composition and the utilization of cellulose units bonded with said adhesive composition, the resin content thereof being in its infusible, water-insoluble thermoset state. The adhesive composition of the present invention is admirably adapted for the gluing together of wooden units as, for example, plywood, the units of the plywood being bonded under heat and pressure.

While the phenol-aldehyde resin condensation product utilized in carrying out the present invention may be any of the prior art phenol-aldehyde resins, it is preferred to use those resins set forth in Redfern Reissue Patent No. 23,347 of March 20, 1951, and in Redfern Patents No. 2,631,097 and No. 2,631,098, granted March 10, 1953.

The basic concept of producing a phenol-aldehyde resinous condensation product of high molecular weight is that of prolonging, expanding or widening the condensation reaction in the water soluble phase with a consequent shortening of the time and moving along of the final reaction, that is, the conversion of the resin into an insoluble, infusible product.

In speaking of the phenol-aldehyde condensation product used in carrying out the present invention as soluble in water, applicants are speaking of the salt of the resin as found in alkaline solution. If the solution is neutralized, then the neutral resin is, for all practical purposes, insoluble in water.

In accordance with the disclosure of the Redfern Reissue Patent No. 23,347, the phenol-aldehyde resin condensation product may be produced by forming an aqueous mixture of a monohydric phenol, such as phenol per se, and an aldehyde in which the aldehyde group is the sole reactive group, and an alkaline catalyst accelerating the formation of the resin reaction product on heating. In producing the product set forth in said Redfern reissue patent, the molar ratio of the aldehyde to the phenol may vary from 1:1 to 3:1. The mass produced as above set forth may be heat-reacted to produce a water soluble phenol-aldehyde reaction-product, the viscosity of the latter increasing during the initial reaction period and being indicative of the advancement of the water soluble reaction product toward the stage where the water soluble state terminates, said aldehyde retaining its activity during the formation of the water soluble phenol-aldehyde reaction product. The increased viscosity of the water soluble reaction product and its tendency to progress to a water insoluble reaction product is reduced by adding addition alkaline material as, for example, sodium hydroxide, and further condensing the water soluble resin to a stage where the aqueous solution of the mix preferably, although not necessarily, shows a precipitate upon the addition of ethanol, said condensation product remaining water soluble and having a pH range varying between 9.5 and 14. This alternate step of adding an alkaline material and condensing may be repeated a number of times.

Stated more specifically, the Redfern phenol-aldehyde condensation product may be produced by heat-reacting a mix of the character set forth and producing a water soluble phenol-aldehyde reaction product, the viscosity of the latter increasing during the initial reaction period and being indicative of the advancement of the water soluble reaction product towards a stage where the water soluble state terminates, said aldehyde retaining its activity during the formation of the water soluble phenol-aldehyde reaction product. Thereafter, the steps are performed of alternately adding to the initial resin condensation product an alkali metal hydroxide as, for example, caustic soda and then, after each addition of the alkali metal hydroxide, heating the so-treated reaction-product, each time the alkali metal hydroxide is added there being a reduction of the viscosity of the water soluble resin reaction product and a tendency of the water soluble resin reaction product to progress towards a water-insoluble stage, thereby permitting a further condensation of the resin reaction mass without conversion of the resin reaction mass to a water-insoluble state, said additions of alkali being terminated while the resin reaction product is in a water soluble stage.

In the process set forth in said Redfern Reissue Patent No. 23,347, the increase of viscosity of the water soluble reaction product is indicative of its tendency to progress to a water-insoluble reaction product and the viscosity is progressively reduced by the addition of increments of alkaline material which permits further condensation and further advancement of the resin reaction product toward, but never attaining, an insoluble, infusible stage.

As stated, the phenol-aldehyde resin condensation product utilized in the present invention may be produced in accordance with the disclosure of Redfern Patent No. 2,631,098. In said patent, the ratio between the aldehyde and the phenol is greatly reduced, said ratio varying between one mole of the aldehyde to one mol of the phenol to one and one-half mols of the aldehyde as, for example, formaldehyde, to one mol of the phenol. With this smaller ratio of aldehyde to phenol, upon condensation, the resin becomes insoluble in its aqueous alkaline solution when cooled to 25° C. The resin may then be solubilized by the addition of further alkaline material. On further condensation, the resin again becomes insoluble, and a further addition of alkaline material is necessary in order to resolubilize the resin in aqueous alkaline solution. These alternate steps are continued until the resin is permanently ethanol and water soluble.

The phenol-aldehyde resin condensation product may also be produced in accordance with the disclosure of Baxter and Redfern application Serial No. 406,346, now Patent No. 2,861,977, patented November 25, 1958, where the condensation product is produced by forming an aqueous mixture of a monohydric-phenol having a hydroxyl group attached to a ring carbon, furfural and an inorganic alkaline catalyst accelerating the formation of the resin reaction product on heating, there being present between about 0.1 and about 0.5 mol of furfural for each mol of phenol, heat-reacting the mixture and producing a solution of the monohydric-phenol-furfural resin in phenol, said phenol being in excess and being adapted to combine with a subsequently added second and different aldehyde as, for example, formaldehyde. The monohydric-phenol-furfural resin in solution in an excess of phenol as, for example, phenol per se ($C_6H_5OH$) is heat-reacted and intercondensed with the second aldehyde as, for example, formaldehyde, in the presence of an alkali metal hydroxide as, for example, sodium hydroxide until the final intercondensed resin solution having a solids content between about 43% and about 47% has a viscosity between the limits of about 500 cps. and about 2500 cps., there being present between about 1.5 and 2.9 mols of aldehyde as, for example, formaldehyde for each mol of phenol, the total alkaline material present during the production of the monohydric-phenol-furfuraldehyde intercondensed resin as, for example, phenol-furfural-formaldehyde intercondensed resin, being equivalent to about 0.1 to about 1.0 mol of sodium hydroxide per mol of phenol.

It is well known that the consistency of plywood adhesive may vary from the syrupy, near-Newtonian type to the gelatinous, thixotropic type. The difference in the consistency of the various adhesives is apparent and can be set forth quantitatively by measuring the viscosities at different rates of shear. A thixotropic adhesive has the following advantages:

(1) In the lower viscosity range, there is less tendency for an extender material to settle to the bottom of the mixture when the mixture is allowed to stand.

(2) The difference in spread weight of the adhesive from one core veneer to another core veneer due to differences in the wood has been found to be less pronounced.

(3) After being spread, the lower viscosity thixotropic adhesives do not soak into the core veneer excessively because with the cessation of agitation the gel forces restore themselves and reduce the fluidity of the adhesive in its spread state. This produces better gluing efficiency.

(4) The gel forces in the spread film also cause the film to retain its spread pattern, which is an imprint of the grooving of the spreader roll rather than flowing out in a flat film. Therefore, when the conditions tending to cause drying of the adhesive during the assembly period of the plywood are severe, the thicker streaks of adhesive film can usually still retain enough moisture to flow adequately during the pressing operation, and thus produce a passable bond.

It has previously been proposed in the plywood industry to combine a thermosetting phenol-aldehyde resin with a lignocellulose extender of the character herein used, and it has been further proposed to swell the extender with an alkali solution. The phenol-aldehyde resin solution, and by that is meant the salt of the resin in alkaline solution, previously used had a low total solids content and a low resin solids content. The lower resin solids phenol-aldehyde condensation products used in producing the prior art adhesive compositions have a lower viscosity than the solution of the phenol-aldehyde condensation product utilized in the present invention; and the adhesive composition utilizing the resin having a low resin solids content had a lower viscosity than the adhesive of the present invention. In fact, the adhesives of the prior art are so low in resin solids and so low in viscosity that the gel forces inherent in the alkali-swelled ligno-cellulose or lignin extender have little opportunity to come into play and, therefore, the last three advantages above set forth for thixotropic adhesives are lost.

In one form of the present invention there is provided a process of producing a phenol-aldehyde adhesive composition having a thixotropic consistency, said method comprising preparing an aqueous alkaline solution of a thermosetting phenol-aldehyde resin condensation product, mixing a first portion of said resin solution with a dilute sodium hydroxide solution, an extender selected from the group consisting of ligno-cellulose produced as a by-product of dilute acid hydrolysis of vegetable matter, the pentosans thereof having been hydrolyzed, said ligno-cellulose still retaining a substantial cellulose content which, preferably although not necessarily, varies between the limits of 5% to 40%, said group including a material which is essentially lignin produced by dilute acid hydrolysis of vegetable matter. The sodium hydroxide swells the extender to confer viscosity stability on the adhesive composition. The resulting mass, comprising the solution of the phenol-aldehyde condensation product, the dilute alkaline solution and the swelled extender is mixed with a second portion of the same thermosetting phenol-aldehyde condensation solution, whereupon the swelling of the extender terminates; the resulting mass is also thinned by virtue of the second portion of the thermosetting phenol-aldehyde condensation solution for the reception of a filler. Thereafter, the thinned mass is mixed with a filler which preferably has thickening and bulking properties. Thereafter, a third portion of the same thermosetting phenol-aldehyde resin condensation solution is added to increase the resin solids content of the aqueous alkaline adhesive composition. In accordance with one form of the present invention, the thermosetting resin solution utilizing in carrying out the invention has a resin solids content between the limits of 43% and 47% when the resin solution has a viscosity between the limits of about 500 and about 2500 centipoises, said adhesive composition having a total solids content based on the weight of the adhesive composition between the limits of about 43% and about 51%. The ratio of the extender to the resin solids present in the alkaline solution of the thermosetting resin is between 0.3:1 and 0.45:1. The ratio of the sodium hydroxide added to swell the extender to the resin solids content of the aqueous solution of the thermosetting phenol-aldehyde condensation product is between 0.04:1 and 0.07:1.

It is desired to point out that the alkali hydroxide used to swell the extender, and in the preferred form of the invention is sodium hydroxide, while conferring viscosity stability on the adhesive composition, simultaneously tends to retard the cure rate of the adhesive composition. In order to counteract any retardation in the rate of cure of the final resin adhesive composition induced by the action of said alkali hydroxide, the filler is mixed with an accelerator which functions to counteract said retardation. Preferably, this counteracting accelerator is dispersed through the filler and may be any material which will function to increase the cure rate of the adhesive. In the more limited form of the invention, this accelerator is sodium carbonate. Potassium or lithium carbonate may be used, but the potassium carbonate apparently functions somewhat slower and not as well as the sodium carbonate. In the more limited aspect of the invention, the sodium carbonate should be present in an amount equal to about between 1 and 2 times the weight of the alkali hydroxide as, for example, sodium hydroxide which is added to the first portion of the phenol-aldehyde condensation solution at, or about, the time that the extender is added.

The cure accelerator may be selected from the group consisting of the alkali metal carbonates, the alkali metal silicates, the alkali metal borates and the alkali metal phosphates. Either the sodium or potassium compounds may be used, but preferably for all of the above the sodium compound is most effective as, for example, sodium carbonate, sodium silicate, sodium borate and sodium phosphate.

In the limited form of the present invention, the mixture of dilute solution of alkali hydroxide as, for example, sodium hydroxide, the first portion of the phenol-aldehyde condensation solution and extender is maintained not higher than about 110° F. or 120° F. to inhibit solubilization of the extender and to some extent prevent degradation of the extender which reflects itself in a low final mix viscosity. The dilute solution of the alkali hydroxide is usually produced by dissolving the alkali hydroxide in water, and the temperature of the water should be not above 60° F. to 80° F., because when the extender is added there is a considerable amount of heat produced. If the water which is used to produce the dilute sodium alkali hydroxide is kept at about 60° F. or 70° F., then the temperature of the mixture of the dilute alkali hydroxide solution, the first portion of the resin and the extender will not rise above about 110° F. to 120° F.

The present invention will be illustrated by the following example.

EXAMPLE I

First, a phenol-aldehyde resin condensation product is prepared as follows, said product being herein identified as resin A.

| | Parts by weight |
|---|---|
| 90.00% phenol ($C_6H_5OH$) | 27.33 |
| Water (first increment) | 1.93 |
| 37.00% formaldehyde | 53.06 |
| 50.00% NaOH (first increment) | 5.10 |
| 50.00% NaOH (second increment) | 0.85 |
| 50.00% NaOH (third increment) | 0.85 |
| 50.00% NaOH (fourth increment) | 1.70 |
| 50.00% NaOH (fifth increment) | 2.48 |
| Water (second increment) | 3.20 |
| 50.00% NaOH (sixth increment) | 3.50 |
| Total | 100.00 |

The phenol, first increment of water, and formaldehyde are placed in the reaction kettle and agitated. The temperature is adjusted to 20–23° C. The first increment of sodium hydroxide is then added and the temperature rises to 35° C. Whenever the temperature tends to drop below 35° C., another caustic soda increment is added until the second, third and fourth increments have been added. The temperature is then maintained with externally-applied heat if necessary at 35° C. until 105 minutes after the first NaOH increment was added. At this point the fifth NaOH increment is added and heat is applied to bring the charge to 90° C. in the next 30 minutes. During this temperature rise, at about 85° C., the second increment of water is added. Its addition at this point helps to level the temperature off at 90° C. at the end of the 30 minutes. The temperature is maintained at about 90° C. until a resin viscosity of about 165 to about 200 centipoises is reached, measured at 25° C., and then lowered to 85° C. in about 20 minutes. The charge is held at about 80° C. until the resin viscosity reaches about 1070 centipoises, measured at 25° C., and then the sixth increment of sodium hydroxide is added. The temperature is maintained at 80° C. until the viscosity measured at 25° C. is about 500 to 550 centipoises, and then reduced to room temperature. The final viscosity is 627 to 1070 centipoises, measured at 25° C. The percentage total solids is about 44.5 determined by heating a one-gram sample for 1¾ hours at 125° C. The specific gravity is about 1.205 at 25° C.

A plywood adhesive using the above produced thermosetting resin is prepared by mixing the following ingredients in the order and in the manner specified:

100 parts by weight of water are mixed with 20 parts by weight of 50% sodium hydroxide and stirred to produce a dilute alkaline solution. Thereafter, 70 parts by weight of the thermosetting resin above produced are added to the dilute alkaline solution, or more specifically, to the dilute sodium hydroxide solution. This first addition is herein identified as the first resin portion. The mixture is stirred to thoroughly mix. Thereafter, there is added 80 parts by weight of ground ligno-cellulose residue extender produced as a by-product from the manufacture or furfural, said ligno-cellulose being merchandised under the trademark "Furafil 100." The intimate mixture of sodium hydroxide, resin and extender is mixed for a period of 10 minutes, during which time the ligno-cellulose extender is dispersed and swelled. The time of mixing, of course, will vary with the particular extender used, particular resin used, and the apparatus. Therefore, the period of 10 minutes is set forth by way of illustration and not by way of limitation.

Thereafter, the second resin portion comprising 70 parts by weight of the above produced thermosetting phenol-aldehyde resin is added to the resultant mass and the mixture agitated for about 5 minutes. The addition of the second portion of resin stops the swelling of the extender, and thins the mix enough to allow the next ingredient to be mixed in. The filler is then added to the so-produced mix and this filler comprises 30 parts by weight of a mixture consisting of 48⅓% sodium carbonate and 48⅓% non-fibrous component of Douglas fir bark phloem, merchandised by the Weyerhaeuser Timber Company, under a trademark "Silvacon 490." Instead of using this particular filler, other fillers may be used, as herein pointed out. There is also added 3⅓% of an anti-foam agent, of which there are a number on the market, but preferably the anti-foam agent is one set forth in Coyne Patent No. 2,524,309. After the addition of the filler with the sodium carbonate dispersed therethrough, the mix is agitated for a period of about 5 minutes, and then a third portion of the thermosetting phenol-aldehyde resin condensation product is added in amount of 360 parts by weight. Thereafter, the mass is agitated.

The final product is a dark brown, homogeneous, thixotropic mixture with excellent spreading properties. Its viscosity is between the limits of 30 and 50 units on a McMichael viscosimeter at 25° C., using a No. 26 wire, 20 R. P. M. rotation, and 5 cm. spindle immersion.

The weights of the materials and the mixing technique produce a resin that has optimum spreading properties. When utilizing the weights of materials set forth in the above example, the adhesive composition has a total solids-content of 47% based on the weight of the adhesive composition and the ratio of resins solids to extender to sodium hydroxide to sodium carbonate is $$1:0.36:0.045:0.067$$

Referring to the above example, the water, sodium hydroxide and the first portion of the resin solution form a medium in which the ligno-cellulose extender is dispersed and swelled. It is preferable to have the proportions of the dilute sodium hydroxide solution and the first portion of the resin solution about as set forth, so that when the extender is added thereto the resulting mass will not be too viscous, as this will tend to damage some of the conventional mixing equipment. In order to have substantially complete swelling of the extender, the sodium hydroxide solution is desirably as set forth. Of course, when the extender consists essentially of lignin, then the amount of sodium hydroxide added will vary somewhat, but should be fairly close in amount to that set forth in the example.

An increase in the weight of water tends to cause too low a viscosity in the final mix and tends to dilute the resin solids of the final mix. Therefore, the water should be present in such a proportion that the final viscosity of the mix should be between about 120 McMichael units on a number 30 wire and about 50 McMichael units on a number 26 wire when utilizing a resin solution containing a resin solids content between the limits of about 43% and 47%, and the viscosity of the resin solution is between 500 and 2500 centipoises, and the total solids content, based on the weight of the adhesive composition is between the limits of about 43% and about 51%.

The amount of alkali hydroxide as, for example, caustic soda which is added to the 70 parts by weight of the resin which has been prepared as set forth is about the amount of caustic that should be used in compounding the final adhesive composition. An increase in the weight of the alkali hydroxide used tends to make the adhesive composition slow-curing; that is, the adhesive composition will require a longer pressing time. In general, the alkali metal hydroxide as, for example, sodium hydroxide can vary somewhat, but the best way to express the variation is to state that the alkali metal hydroxide to resin solids ratio of the resin used may vary as follows: 0.04:1 to 0.07:1. This is the ratio variation when using sodium hydroxide and will be approximately the same if potassium hydroxide is used, although potassium hydroxide acts much slower than sodium hydroxide, that is caustic soda, and, therefore, usually will not be used. It may be stated that too much sodium hydroxide tends to confer on the final adhesive composition a slower rate of cure, and too little sodium hydroxide causes incomplete swelling of the extender.

It is desirable to split the addition of the alkaline solution of the phenol-aldehyde condensation product into a plurality of portions and to add merely a part of the resin solution which is present in the final composition at the time when the extender is added. If all of the resin solution were added at this time, there is a tendency for the resin solution to interfere with the desired swelling of the extender.

It is desired to point out that the dilute alkali solution in the first portion of the resin solution should be mixed with the extender for a period of time sufficient to give the predetermined amount of extender swelling found desirable. Necessarily this will vary with the kind of extender used, the kind of resin used and other factors.

The function of the addition of the second portion of the resin solution is to stop the swelling of the extender, and also to somewhat thin the mix to allow the next composite addition to be added. The composite addition material, in one form of the invention, is a mixture of sodium carbonate, anti-foam, and the bark phloem fraction. The latter acts as a dispersing ingredient for the sodium carbonate, and the anti-foam ingredient also functions to raise the viscosity of the final mix. The anti-foam material assists in preventing foaming during spreading.

The function of the third portion resin is to bring the resin content of the adhesive composition to an optimum point. In this connection, it may be stated that preferably the resin solids in the adhesive may vary from between the limits of 29% and 33%, taken on the weight of the adhesive. The upper limit is not critical except from a cost standpoint. The resin solids in the adhesive composition may be substantially greater and may run up to 50%, and the lower limit can be reduced to about 20%. In general, too little resin solids present in the adhesive will cause sensitivity to variable gluing conditions, such as tight veneer, moisture content and assembly time.

It is desired to point out that the pre-swelling of the extender as set forth in the above example imparts excellent viscosity stability to the glue mix for a period of several days. If the extender is not pre-swelled very thoroughly, the final mix comprising the adhesive composition may tend to be too thin, and further tends to be unstable in viscosity. In other words, the viscosity in the final mix would rise gradually, and this is undesirable because the method of handling the adhesive, such as adjustment of spread, would then have to be varied according to the age of the adhesive, and further the adhesive characteristics of the adhesive composition would change.

The following is an additional example illustrating the present invention:

EXAMPLE II

A phenol-furfural-formaldehyde resin was prepared by first producing a phenol-furfural resin having an excess of phenol and then interacting said resin, herein identified as resin B, with formaldehyde to produce an intercondensation product of resin B and formaldehyde, said intercondensation product being identified as resin C.

*Preparation of resin B*

A furfural-phenol resin is prepared by mixing the following ingredients in the proportions specified and heating said ingredients:

| | Parts by weight |
|---|---|
| 90% phenol | 77.47 |
| 50% NaOH | 2.79 |
| Furfural | 17.76 |
| Water | 1.98 |
| Total | 100.00 |

The phenol and sodium hydroxide were placed in a jacketed, enclosed reaction kettle fitted with an ordinary condenser and a reflux condenser, either of which could be closed off. The resulting solution was agitated and brought to a state of boiling with steam heat in about a period of 20 minutes. The heating of the resulting solution was continued for about two hours and a distillate consisting of water and phenol was drawn off so that the reaction solution of phenol and sodium hydroxide was boiling at about 127° C. at the end of this period of time. Thereafter, the furfural in the amount set forth was added and the batch was refluxed at a temperature between 120° and 125° C. After a period of time of about 30 minutes it was necessary to withdraw the condensate occasionally to keep the reaction temperature at above 120° C. Cooking was continued thereafter at a temperature between 120° and 125° C. for a further period of 85 minutes, at which time the reaction between the phenol and the furfural was complete. The resin was then cooled to room temperature, that is, about 20° C. and the distillate and formula water were added and blended in. The final product was a dark brown homogeneous liquid with a viscosity of 90 centipoises, a specific gravity of 1.15, and a pH of 8.7.

Resin B was used in the preparation of resin C, which is an intercondensation product of resin B and formaldehyde. Resin B was mixed with formaldehyde, sodium hydroxide, in the following proportions:

| | Parts by weight |
|---|---|
| Resin B | 30.33 |
| 37% uninhibited formaldehyde | 45.55 |
| Water | 11.49 |
| 50% NaOH | 12.63 |
| Total | 100.00 |

Referring to the above, the term "uninhibited formaldehyde" defines formalin, that is, aqueous HCHO solution containing less than 2% of methanol. Inhibited formaldehyde is a grade of formaldehyde which contains about 7% methanol which confers upon the formaldehyde an increased stability during storage. Either grade of formaldehyde may be used in carrying out the present invention. If inhibited HCHO is used in preparing resin C, then a higher temperature is required so as to prevent the cooking time from being too long.

In preparing resin C, resin B was placed in the reaction kettle and about ⅙ of the NaOH used in the preparation of resin B was added to thereby prevent precipitation of the resin. Thereafter, the formaldehyde and water were added, and the temperature of the charge was adjusted to about 20° C. The remainder of the NaOH was then added slowly over a period of 15 minutes until a total of 12.63 parts of 50% sodium hydroxide had been added. The addition of the sodium hydroxide in increments over a period of time promoted and provided a gradual temperature rise since the dilution of the sodium hydroxide and the exothermic reaction initiated by the sodium hydroxide produces a very considerable heating effect. From the start of the addition of the major portion of the sodium hydroxide, the temperature was controlled to rise uniformly to about 90° C. in 45 minutes by passing cold water and steam through the kettle jacket at appropriate times. At the start of the cook, small samples of the mixture showed cloudiness upon dilution due to the water insolubility of resin B, but by the time the temperature had increased to about 50° C., small samples of the mixture were miscible with water in all proportions.

After the mixture of resin B, formaldehyde, water and sodium hydroxide was made and heated as above set forth, the resulting mixture or reaction product was heated at about 90° C. and then the temperature was gradually lowered, so that the final resin had a viscosity of 627 centipoises at 25° C. This resin had a total solids content of 42.8% as determined by heating a one-gram sample at 125° C. for 1¾ hours.

The viscosity of the final intercondensed product is fairly important. This viscosity is the reflection of the degree of advancement or the molecular size of the resin. It is desirable that the resin be advanced so that it progresses far toward the point where the resin becomes insoluble in its mother solution but still does not attain insolubility, that is it remains in solution.

A first portion of the intercondensed phenol-furfural-formaldehyde resin prepared as above set forth was mixed with a sodium hydroxide solution made by mixing 24 parts of 50% sodium hydroxide with 110 parts by weight of water. The mixture was agitated and then there was added 170 parts by weight of the intercondensed resin. The mixture was then stirred and 90 parts by weight of an extender comprising ground lignin residue from the Madison Wood Sugar process added. The resulting mass was then agitated for 10 minutes in order to swell the residue, and then the second portion of the intercondensed phenol-furfural-formaldehyde resin was added in amount of 30 parts by weight. The mixture was then agitated for several minutes. Thereafter, 30 parts by weight of a filler was added consisting of 50% sodium carbonate and 50% ground ligno-cellulose from the manufacture of furfural. The mixture was then agitated for about 5 minutes and then the third portion of the intercondensed resin was added in an amount of about 270 parts by weight. This mixture was agitated about 5 minutes, and then about 10 parts of water was added. The final product is a dark brown, homogeneous thixotropic mixture with excellent spreading properties. The viscosity of the final adhesive composition is 120 units taken on a MacMichael viscosimeter at 25° C., using a No. 30 wire, 20 R. P. M. rotation and 5 cm. spindle immersion.

This adhesive composition was compounded with the same guiding principles as set forth in connection with the disclosure of Example I.

The phenol-aldehyde adhesive composition produced in accordance with Example I was used in the gluing of six 3-ply Douglas fir plywood panels using a spread of 60 to 70 pounds of adhesive composition per 1000 sq. ft. of plywood. The assembly time was 20 minutes. After assembly, the assembled plywood was subjected at a temperature of about 285° platen temperature and at a pressure of 175 lbs. per sq. in. for a period of between 3 and 4 minutes' pressing time. Of course, the temperature used in bonding plywood elements together and the pressure of bonding may be varied between the limits of about 260° F. and 300° F. or 310° F., and the bonding pressure may also be varied. With different temperatures and different pressures of bonding, the time of pressing may also vary. When the cured panels were tested according to the Douglas Fir Plywood Association Commercial Standard CS45-48 boiling test, said panels produced an average wood failure result of 81%.

Referring to the filler which is added after the extender has been added, this may be any material which will provide bulk and which will also provide some thickening of the final adhesive. Most of the prior art filler materials may be used, such as the common fillers, including nut shell flours, wood flours and the like. Thickeners, such as methyl cellulose and some of the natural gums, can be used to provide a thickening effect, but these will not provide the bulking effect. Therefore, it is necessary to mix with such a thickener typified by methyl cellulose an inorganic filler, said filler being the equivalent of the bark fraction utilized in Example I, or of the ligno-cellulose utilized in Example II. These fillers, when mixed with the sodium carbonate accelerators, or equivalent materials previously mentioned, such as the alkali metal silicates, the alkali metal borates and the alkali metal phosphates, will provide bulk to help disperse the cure accelerator. In the examples herein set forth the bark fraction and the ligno-cellulose perform the function of not only providing bulk but also dispersing the cure accelerator, said bark fraction and ligno-cellulose providing a thickening effect to supplement that of the alkali pre-swelled lignin or pre-swelled ligno-cellulose extender.

In the following term "resin solids" is defined as the total solids of the resin solution, which includes some sodium hydroxide, and the alkali metal hydroxide is defined as the alkali hydroxide added during the mixing of the adhesive for the purpose of swelling the extender. Of course, during the production of the resin some alkali hydroxide is added.

The solids content of the phenol-aldehyde condensation product used in carrying out the present invention varies between the limits of about 43% and 47%. Below this range the resulting adhesive would have a low glue viscosity; or stated differently, too low a resin solids content. This follows, because if more resin and less water is used as the dispersing medium for preswelling the extender to keep the resin solids content of the final adhesive mix the same, inadequate swelling of the extender results. Above this range the resin would be too viscous to handle and pump easily at a suitable degree of advance. The resin viscosity should be between about 500 and 2500 centipoises. This is determined by the suitable degree of advancement in the range of solids content involved. Further, too low a viscosity interferes with the ability of the pre-swelled extender to impart a thixotropic, pattern-spreading consistency to the adhesive composition; and too high a viscosity makes the phenolaldehyde resin condensation product too difficult to pump and handle. The ratio of the extender to the resin solids is desirably from 0.3:1 to 0.45:1. The term extender refers to the swelled extender and does not include any filling material added with the sodium carbonate or equivalent. Sometimes this filler is of the same character as the extender, but it is not swelled as set forth in the example, or as herein deemed "preswelled." Too little extender makes it difficult to obtain sufficient viscosity and thixotropy in the final adhesive composition. Too much extender causes low strength in the cured adhesive film. Stated somewhat differently, the amount of the pre-swelled extender in the final adhesive composition may vary between from 9 to 14%, taken on the weight of the adhesive composition. The alkali hydroxide, that is, sodium hydroxide ratio to resin solids ratio is between 0.04:1 to 0.07:1. Too much sodium hydroxide tends to produce a slow rate of cure, and too little sodium hydroxide causes incomplete swelling of the extender. Preferably, the ratio of the alkali hydroxide, that is, sodium hydroxide, to the extender varies between 0.1:1 to 0.2:1. While this is a desirable ratio, it can, of course, be varied considerably, and the present invention could produce a very excellent adhesive composition. The only effect of varying the ratio is to slow up the rate of cure somewhat or to incompletely swell the extender. The total solids in adhesive should vary between about 43% and 51%, taken on the weight of the adhesive. Too low a solids content makes it impossible for the adhesive composition to retain a thixotropic, pattern-spreading consistency. Too high a total solids content necessitates the use of a low proportion of water in the pre-swelling of the extender, and this hinders the swelling of the extender.

It is preferred that the amount of the two first resin additions should be just about sufficient to keep the adhesive mix at that stage having a consistency which is not greater than that of a medium dough at any stage during its preparation, that is, the mix at this stage should not be liquid or solid, but should be a doughy mix.

"Furafil 100," mentioned in the herein example, is the residuum from the production of furfural from corn cobs. The corn cobs are ground and heated under pressure with acid, which hydrolyzes the pentosans to furfural. The ligno-cellulose residue is dried and ground further. This is the product that is marketed under the trade name "Furafil" by the Quaker Oats Company.

The preferred phenol used in carrying out the present invention is phenol per se, $C_6H_5OH$. However, meta-cresol may be used and also 3,5-xylenol, both of which, when condensed with an aldehyde, such as formaldehyde or any material generating formaldehyde, form thermosetting resins.

Instead of using formaldehyde, which is the preferred aldehyde, para-formaldehyde or meta-formaldehyde may be used.

It is desirable to incorporate in the phenol-aldehyde adhesive composition an anti-foam agent, and this anti-foam agent may comprise the composition set forth in Coyne Patent No. 2,524,309, where it is stated that the anti-foam composition comprises a dispersed mixture of an alkaline earth stearate, pine oil, and a petroleum distillate having a boiling point between that of gasoline and SAE No. 30 lubricating oil. In the mixture the stearate constitutes from about 1.0% to 12.0% by weight of the mixture, and the remainder of said mixture comprises pine oil and petroleum distillate in the ratio of 1:1 to 7:1. Any of the prior art anti-foam agents which are compatible with the adhesive composition may be substituted for the Coyne anti-foam agent.

The lignin residue utilized in Example II is produced from the Madison Wood Sugar process, which is described in "Industrial and Engineering Chemistry," September 1946, pages 890–895, and said disclosure is by reference incorporated in the subject application.

What is claimed is:

1. An adhesive composition of thixotropic consistency comprising an aqueous alkaline solution of the thermosetting resin-condensation product of a monohydric phenol selected from the group consisting of phenol per se, metal-cresol, and 3,5-xylenol, and an aldehyde in which the aldehyde radical is the sole reactive radical, a swelled lignin-containing extender, a bulking filler, said alkaline solution of the phenol-aldehyde resin having a resin solids-content between the limits of about 43% and about 47% when the resin solution has a viscosity between the limits of about 500 and about 2500 centipoises, and sufficient water to provide said adhesive composition with a total solids content between about 43% and about 51% taken on the weight of the adhesive composition, the ratio of the swelled extender to the resin solids present in the alkaline solution of the thermosetting resin being between 0.3:1.0 and 0.45:1.0.

2. The adhesive composition defined in claim 1 having a MacMichael viscosity between the limits of about 30 and about 120.

3. The adhesive composition defined in claim 1 in which the aqueous alkaline solution of the thermosetting resin-condensation product is a sodium hydroxide solution and the aldehyde is formaldehyde.

4. In the production of a phenol-aldehyde adhesive composition wherein a lignin-containing extender is swelled by an alkaline swelling agent in the presence of an aqueous alkaline solution of a thermosetting condensation product of a monohydric phenol selected from the group consisting of phenol per se, meta-cresol, and 3,5-xylenol, and an aldehyde in which the aldehyde radical is the sole reactive radical, the step of introducing into the resulting mixture an alkaline solution of a thermosetting monohydric phenol-aldehyde resin condensation product and thereby terminating the swelling of said extender, said latter resin condensation product being the condensation product of a monohydric phenol selected from the group consisting of phenol per se, meta-cresol, and 3,5-xylenol, and an aldehyde in which the aldehyde radical is the sole reactive radical.

5. The method defined in claim 4 in which the alkaline swelling agent is sodium hydroxide.

6. The method defined in claim 5 in which the mixture of the sodium hydroxide, the first solution of the phenol-aldehyde condensation product, and the lignin-containing extender is maintained at a temperature below 120° F. to inhibit solubilization of the extender thereby inhibiting the production of a final adhesive composition of low viscosity.

7. In the production of a phenol-aldehyde adhesive composition wherein a lignin-containing extender is swelled by an alkaline swelling agent in the presence of an alkaline solution of a thermosetting condensation product, the steps of introducing into the resulting mixture a second alkaline solution of a thermosetting condensation product and thereby terminating the swelling of said extender, and incorporating into the resulting mass containing said swelled extender a bulking material and a third alkaline solution of a thermosetting condensation product to thereby increase the resin solids-content of the adhesive composition, each of said thermosetting condensation products being a condensation product of a monohydric phenol selected from the group consisting of phenol per se, meta-cresol, and 3,5-xylenol, and an aldehyde in which the aldehyde radical is the sole reactive radical.

8. In the production of a phenol-aldehyde adhesive composition wherein a lignin-containing extender is swelled by an alkaline swelling agent in the presence of an alkaline solution of a thermosetting condensation product, the steps of introducing into the resulting mixture a second alkaline solution of a thermosetting condensation product and thereby terminating the swelling of said extender, and incorporating in the resulting mass containing said swelled extender a bulking material having dispersed therethrough a cure accelerator for the condensation product to counteract any retardation in the rate of cure of the final resin composition, and a third alkaline solution of a thermosetting condensation product to thereby increase the resin solids-content of the adhesive composition, each of said thermosetting condensation products being a condensation product of a monohydric phenol selected from the group consisting of phenol per se, meta-cresol, and 3,5-xylenol, and an aldehyde in which the aldehyde radical is the sole reactive radical.

9. The method defined in claim 8 in which the alkaline swelling agent is sodium hydroxide and the aldehyde is formaldehyde.

10. The method of producing a phenol-aldehyde adhesive composition having a thixotropic consistency comprising mixing a first aqueous alkaline solution of a thermosetting resin-condensation product, with a lignin-containing extender and an alkaline swelling agent for said extender, mixing the resulting mass and dispersing and swelling the extender, mixing the so-produced material with a second aqueous alkaline solution of a thermosetting resin-condensation product and thereby terminating the swelling of the extender and thinning the mass for the reception of a filler, and mixing the resulting mass with a filler having bulking properties and a third aqueous alkaline solution of a thermosetting resin-condensation product to thereby increase the resin solids-content of the final adhesive composition, each of said solutions of the thermosetting resin having a resin solids-content between the limits of about 43% and about 47% when the resin solution has a viscosity between the limits of about 500 and about 2500 centipoises, adding sufficient water to provide said adhesive composition with a total solids-content taken on the weight of the adhesive composition between the limits of about 43% and about 51%, the ratio of the swelled extender to said resin solids present in the alkaline solution of the thermosetting resin-condensation product being between 0.3:1.0 and 0.45:1.0, each of said thermosetting condensation products being a condensation product of a monohydric phenol selected from the group consisting of phenol per se, meta-cresol, and 3,5-xylenol, and an aldehyde in which the aldehyde radical is the sole reactive radical.

11. The method defined in claim 10 in which the alkaline swelling agent is sodium hydroxide and the aldehyde is selected from the group consisting of formaldehyde and furfural.

12. The method defined in claim 10 in which the adhesive composition has the herein specified MacMichael viscosity between the limits of about 30 and 120.

13. The method defined in claim 10 in which the mixture of the alkaline swelling agent for said extender, the first solution of the phenol-aldehyde condensation product and the lignin-containing extender is maintained at a temperature below about 120° F. to inhibit solubilization of the extender thereby inhibiting the production of a final adhesive composition of low viscosity.

14. The method of producing a phenol-aldehyde adhesive composition having a thixotropic consistency comprising preparing an alkaline solution of a thermosetting resin condensation product of a monohydric phenol selected from the group consisting of phenol per se, meta-cresol, and 3,5-xylenol, and an aldehyde in which the aldehyde radical is the sole reactive radical, mixing a first portion of said resin solution with a dilute sodium hydroxide solution and a lignin-containing extender, the sodium hydroxide swelling the extender to confer viscosity stability on the adhesive composition, mixing the so-produced material with a second portion of said aqueous solution of the thermosetting phenol-aldehyde condensation product and thereby terminating the swelling of the extender and thinning the mass for the reception of a filler, and mixing the resulting mass with a filler having bulking properties and a third portion of the alkaline thermosetting phenol-aldehyde resin-condensation solution to increase the resin solids-content of the final aqueous alkaline adhesive composition, said thermosetting resin solution having a resin solids-content between the limits of about 43 and about 47% when the resin solution has a viscosity between the limits of about 500 and 2500 centipoises, said adhesive composition having a total solids-content taken on the weight of the adhesive composition between the limits of about 43% and about 51%, the ratio of the swelled extender to the resin solids present in the alkaline solution of the thermosetting resin being between 0.3:1.0 and 0.45:1.0.

15. The method defined in claim 14 in which the thermosetting phenol-aldehyde condensation product is a phenol-furfural-formaldehyde condensation product.

16. The method of producing a phenol-aldehyde adhesive composition having a thixotropic consistency comprising preparing an alkaline solution of a thermosetting resin-condensation product of a monohydric phenol selected from the group consisting of phenol per se, meta-cresol, and 3,5-xylenol, and an aldehyde in which the aldehyde radical is the sole reactive radical, mixing a first portion of said resin solution with a dilute sodium hydroxide solution and a lignin-containing extender, the sodium hydroxide swelling the extender to confer viscosity stability on the adhesive composition, mixing the so-produced material with a second portion of said aqueous solution of the thermosetting phenol-aldehyde condensation product and thereby terminating the swelling of the extender and thinning the mass for the reception of a filler, and mixing the resulting mass with a filler having bulking properties, said filler having dispersed therethrough a cure accelerator to counteract any retardation in the rate of cure induced by the added sodium hydroxide solution, and a third portion of the alkaline thermosetting phenol-aldehyde resin-condensation solution to increase the resin solids-content of the final aqueous alkaline adhesive composition, said thermosetting resin solution having a resin solids-content between the limits of about 43 and about 47% when the resin solution has a viscosity between the limits of about 500 and 2500 centipoises, said adhesive composition having a total solids-content taken on the weight of the adhesive composition between the limits of about 43% and about 51%, the ratio of the swelled extender to the resin solids present in the alkaline solution of the thermosetting resin being between 0.3:1.0 and 0.45:1.0.

17. The method defined in claim 16 in which the cure accelerator is selected from the group consisting of alkali metal carbonate, alkali metal silicate, alkali metal borate and alkali metal phosphate.

18. The method defined in claim 16 in which the cure accelerator is sodium carbonate in an amount equivalent to about one to two times the weight of the sodium hydroxide taken on an anhydrous basis.

19. The method of producing a phenol-aldehyde adhesive composition having a thixotropic consistency comprising mixing a first alkaline solution of a thermosetting resin-condensation product with a lignin-containing extender and a sodium hydroxide swelling agent for said extender, the swelled extender functioning to confer viscosity stability on the adhesive composition, mixing the so-produced material with a second aqueous alkaline solution of a thermosetting resin-condensation product and thereby terminating the swelling of the extender and thinning the mass for reception of a filler, and mixing the resulting mass with (a) a filler having bulking properties, said filler having dispersed therethrough sodium carbonate acting as a cure accelerator for the resin-condensation product to counteract any retardation in the rate of cure of the final resin composition, and (b) a third aqueous alkaline solution of a thermosetting resin-condensation product to thereby increase the resin solids-content of the final adhesive composition, each of said solutions of the thermosetting resin having a total solids-content of about 44.5% when the resin solution has a viscosity between the limits of about 627 and about 1070 centipoises measured at 25° C., said adhesive composition having a total solids-content based on the weight of the adhesive composition of about 47%, said adhesive composition having a resin solids to extender to sodium hydroxide to sodium carbonate ratio of 1:0.36:0.045:0.067, each of said thermosetting condensation products being a condensation product of a monohydric phenol selected from the group consisting of phenol per se, meta-cresol, and 3,5-xylenol, and an aldehyde in which the aldehyde radical is the sole reactive radical.

20. The method of producing a phenol-aldehyde adhesive composition having a thixotropic consistency comprising treating a lignin-containing extender with an alkaline solution of a thermosetting phenol-aldehyde resin condensation product containing a sufficient amount of an alkali metal hydroxide to swell the lignin-containing extender, the mixture of the phenol-aldehyde resin condensation product, alkali metal hydroxide and the extender being maintained at a temperature below 120° F. to inhibit solubilization of the extender, mixing the so-produced material with an alkaline solution of a thermosetting phenol-aldehyde resin condensation product and thereby terminating the swelling of the extender and thinning the mass for the reception of a filler, mixing the resulting mass with a filler having bulking properties and a solution of an alkaline thermosetting phenol-aldehyde condensation product to increase the resin-solids content of the final aqueous alkaline adhesive composition, the thermosetting resin of each of said alkaline solutions being the condensation product of a monohydric phenol selected from the group consisting of phenol per se, meta-cresol, and 3,5-xylenol, and an aldehyde in which the aldehyde radical is the sole reactive radical, each of said thermosetting resin solutions having a resin-solids content between the limits of about 43% and about 47% when the resin solution has a viscosity between the limits of about 500 and 2500 centipoises, adding sufficient water to provide said adhesive composition with a total solids content taken on the weight of the adhesive composition between the limits of about 43% and about 51%, the ratio of the swelled extender to the resin solids present in the alkaline solution of the thermosetting resin being between about 0.3:1.0 and 0.45:1.0.

References Cited in the file of this patent

UNITED STATES PATENTS

| | | |
|---|---|---|
| 2,197,724 | Hovey et al. | Apr. 16, 1940 |
| 2,488,428 | Nagel | Nov. 15, 1949 |
| 2,507,465 | Ayers | May 9, 1950 |
| 2,620,321 | Schrader et al. | Dec. 2, 1952 |

OTHER REFERENCES

Modern Plastics, September 1949, pages 119, 168–169.